(12) United States Patent
Lawler et al.

(10) Patent No.: US 9,100,402 B2
(45) Date of Patent: Aug. 4, 2015

(54) COGNITIVE AGENT

(71) Applicant: MICROSOFT CORPORATION, Redmond, WA (US)

(72) Inventors: Stephen L. Lawler, Redmond, WA (US); Eyal Ofek, Redmond, WA (US); Gur Kimchi, Bellevue, WA (US); Leonard Smith, Jr., Seattle, WA (US); Avi Bar-Zeev, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/868,717

(22) Filed: Apr. 23, 2013

(65) Prior Publication Data

US 2013/0246512 A1    Sep. 19, 2013

Related U.S. Application Data

(63) Continuation of application No. 13/455,899, filed on Apr. 25, 2012, now Pat. No. 8,428,908, which is a continuation of application No. 12/415,860, filed on Mar. 31, 2009, now Pat. No. 8,195,430.

(51) Int. Cl.
| | |
|---|---|
| *G06F 11/30* | (2006.01) |
| *G21C 17/00* | (2006.01) |
| *H04L 29/08* | (2006.01) |
| *G06N 3/00* | (2006.01) |
| *G06Q 10/06* | (2012.01) |
| *G06Q 30/02* | (2012.01) |

(52) U.S. Cl.
CPC .............. *H04L 67/10* (2013.01); *G06N 3/006* (2013.01); *G06Q 10/0637* (2013.01); *G06Q 30/0273* (2013.01)

(58) Field of Classification Search
CPC ...... G06N 3/006; H04L 67/10; H04L 69/329; H04L 67/02; H04L 67/28; H04L 67/2823; G06Q 30/0273; G06Q 10/0637; G06Q 30/02; G06Q 10/10; G06F 17/30011
USPC ......... 702/182, 183, 184, 186, 188; 705/7.15, 705/7.36, 14.69, 14; 706/12, 46; 707/10; 709/201, 203, 217, 223, 229; 715/706, 715/762

See application file for complete search history.

(56) References Cited

U.S. PATENT DOCUMENTS

| | | | |
|---|---|---|---|
| 2002/0120627 A1* | 8/2002 | Mankoff | 707/10 |
| 2005/0091362 A1* | 4/2005 | Shigeta et al. | 709/223 |

* cited by examiner

*Primary Examiner* — John H Le

(74) *Attorney, Agent, or Firm* — Jessica Myers; Jim Ross; Micky Minhas

(57) ABSTRACT

Aspects relate to a cognitive agent that performs functions associated with a desired result. The functions performed by cognitive agent supplement other activities performed at a same time. In such a manner, the cognitive agent can function as a surrogate for a user. A performed activity can trigger implementation of another activity that is an extension of the performed activity. Cognitive agent can perform functions that can be represented as an avatar. Further, cognitive agent can be associated with a diagnostics component that evaluates an operating condition. Based on the operating condition cognitive agent can implement automatic actions associated with mitigating failures and/or prolonging the life of machinery.

33 Claims, 9 Drawing Sheets

COGNITIVE AGENT

CROSS-REFERENCE TO RELATED APPLICATIONS

This application is a continuation of U.S. application Ser. No. 13/455,899 (filed on Apr. 25, 2012, and issuing as U.S. Pat. No. 8,428,908), which is a continuation of U.S. application Ser. No. 12/415,860 (filed on Mar. 31, 2009, and issued as U.S. Pat. No. 8,195,430). All of the aforesaid patents and applications are hereby incorporated herein by reference.

BACKGROUND

With the advanced computing technologies available today, more and more people demand instant access to data and other information. Further, since such a vast amount of data is readily available, people tend to become more inquisitive and search for information on a large variety of topics and/or locations. At times, the desire and/or need for information can be overwhelming and, due to time constraints, commitments, and other limitations (e.g., putting a task off and forgetting about it), people might not have time to perform all the research or obtain all the desired information.

Many people utilize avatars as a way to express a computer generated representation of themselves or as their alter ego. The avatar can be represented as a two-dimensional icon (e.g., picture) or a three-dimensional model. Generally, avatars are constructed to represent a friend or assistant who can interact with the user or an environment of the user as a distinct entity in relation to the perspective of that user. However, today's avatars are arbitrarily discussed or implemented as distinct third-person entities. Once implemented these avatars generally do nothing more than visually represent an entity.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with a cognitive agent that acts as a surrogate for a user. The cognitive agent can autonomously perform actions with little, if any, interaction from the user. A request for a result can be provided through an express request or based on an inference. Actions to achieve the result can be automatically performed and after completion (or based on other factors) the results can be presented to the user. While the actions are being autonomously performed by the cognitive agent, the user is free to perform other actions that might supplement the actions of cognitive agent and/or actions that might relate to something else (e.g., traveling, sleeping, and so on).

In accordance with some aspects, the cognitive agent can be represented as an avatar. The avatar can assist the user to complete a task, can provide a guided tour, or perform other functions (e.g., navigate the user through a store, provide a workout buddy, and so on). In some aspects, the avatar might only be perceivable by the user that requested the guidance or other action from the avatar. However, some avatars can be perceived by other people within the environment.

According to a further aspect, a cognitive agent can selectively perform a self-evaluation, such as on machinery, and automatically implement actions related to the self-evaluation. For example, when associated with machinery, the cognitive agent can gather information, such as maintenance records, length in service, known problems with similar machinery, and so forth. Based on the gathered information and self-diagnostics, a determination can be made automatically that parts should be ordered to mitigate an amount of down time. The cognitive agent can order the parts and provide instructions on how best to repair and/or perform preventive maintenance on the machinery.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Figure 1:
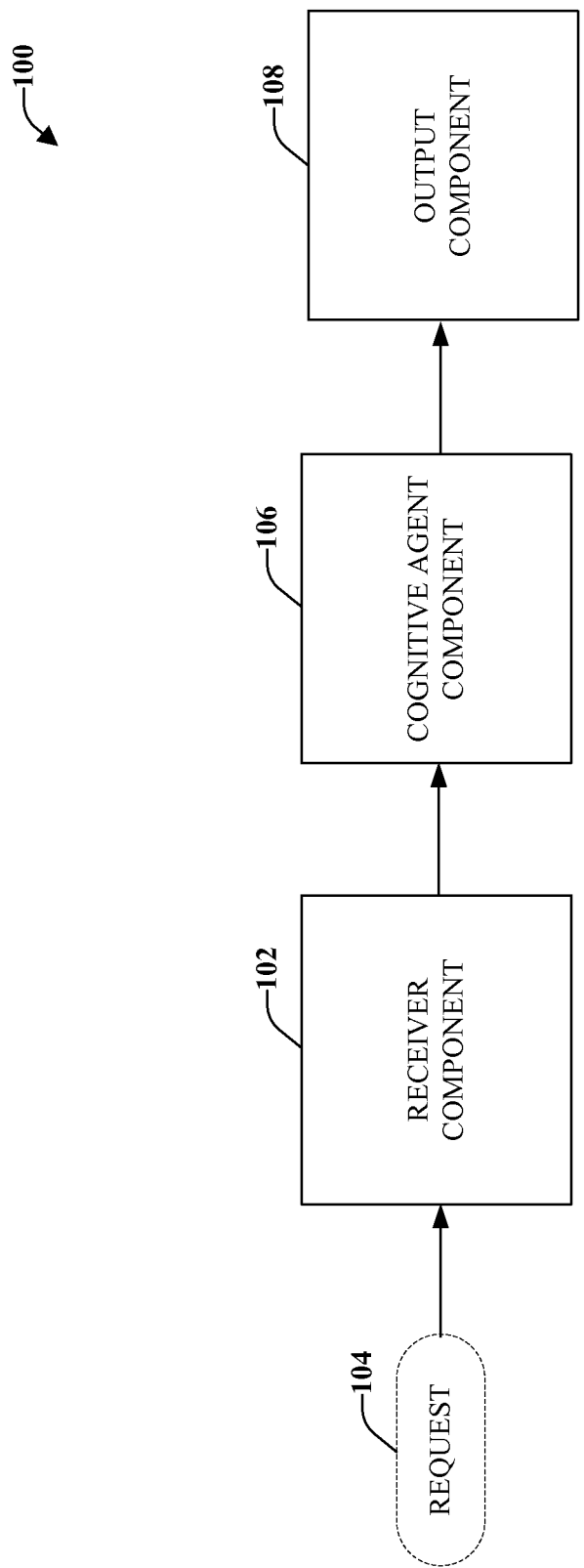
FIG. 1 illustrates a system for providing a cognitive agent that operates as a surrogate by performing various functions without user intervention.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Computing systems employing automated learning and reasoning procedures (e.g., the use of explicitly and/or implicitly trained statistical classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

Various aspects will be presented in terms of systems that may include a number of components, modules, and the like. It is to be understood and appreciated that the various systems may include additional components, modules, and the like and/or may not include all of the components, modules, and the like discussed in connection with the figures. A combination of these approaches may also be used. The various aspects disclosed herein can be performed on electrical devices including devices that utilize touch screen display technologies, mouse-and-keyboard type interfaces, cameras, accelerometers, compass, microphone, barometer, force sensor, temperature, blood pressure/heart monitoring, and/or other interfaces. Examples of such devices include computers (desktop and mobile), smart phones, personal digital assistants (PDAs), and other electronic devices both wired and wireless.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Referring initially to FIG. 1, illustrated is a system 100 for providing a cognitive agent that operates as a surrogate by performing various functions without (or with minimal) user intervention. The cognitive agent can be a machine assistant that automatically starts an action and/or completes an action. In accordance with some aspects, the cognitive agent provides enough information to allow a human (e.g., personal assistant) to perform an action (e.g., receives an input from a user and transmits the appropriate information to a human assistant).

System 100 includes a receiver component 102 that is configured to accept a request 104 for performance of a function that achieves an end result. The request 104 can be received directly from the user, such as though a direct input (e.g., the user typing in the request on a keyboard, the user verbally stating the request, and so on). In accordance with some aspects, the request can be based on an inference that the user would like a particular function to be performed in order for a result to be achieved. The inference can be made based on observance of a different activity being performed by the user, no activities performed by the user after receipt of the request, or based on other considerations (e.g., the user is traveling, calendar indicates the user is not available, and so forth).

A cognitive agent component 106 is configured to perform the requested activity automatically. For example, cognitive agent component 106 can collect data related to a topic that the user is researching and parse the data for various content included therein. In another example, cognitive agent component 106 can anticipate a user request and, prior to receiving the request, perform one or more actions that can satisfy the request.

In another example, cognitive agent component 106 can perform mapping operations that can be utilized to benefit a user and/or respond to a user request. For example, a user might be searching for a particular item (e.g., a restaurant) and system 100 can automatically attempt to find more of the same type of item (e.g., restaurants of a same type, such as Italian or Mexican restaurants).

In a further example, based on a profile of the user, gathered through historical data analysis, cognitive agent component 106 can enhance a user experience, such as by offering related information. For example, if a request is received for a general keyword search, system 100 can attempt to understand further context related to the query and determine what is related to the initial search terms. Thus, instead of strictly solving the relevance problem in terms of providing a plurality of results sorted by best match, system 100 can instead provide other items that the user might not have considered (e.g., a search for Rome history is received and system 100 suggests Greek history information also). The other items can be determined based on previous searches, searches performed by other users, synonyms, or other criteria.

It should be understood that the gathering of information related to the user and/or other users can take into account various privacy concerns. For example, a user might need to specifically allow system 100 to collect information associated with that user before any monitoring and/or collection is performed. According the some aspects, the user might need to periodically (e.g., every few months, every year, and so forth) reconfirm that information can be gathered by system 100. If the user does not respond to a prompt asking if the information can be gathered (or if the user denies the request), gathering by system 100 is not performed.

In accordance with some aspects, cognitive agent component 106 can include functionality related to recognition of related activities that should be carried out autonomously in order to provide the user with accurate and complete results. The recognition functionality can review search results, for example, in order to discover commonalities between the results, differences between subsets of results, or anomalies (e.g., one result is different than the other results). In accordance with some aspects, search results might be disregarded based on various criteria, such as dates (e.g., if older than three months ignore), authorship, language, and so forth.

For example, a user might be interested in purchasing a piece of real estate and would like information about offers for sale in a certain geographic location. Cognitive agent component 106 can automatically find real estate that meets criteria pre-defined by the user (e.g., three bedrooms, a pool, and a four car garage). Cognitive agent component 106 can review the content associated with the discovered real estate and might determine that there are gas wells and oil wells on the property. Cognitive agent component 106 can go beyond the mere search for real estate and can review information associated with mineral rights, royalty rights, oil and gas leases, and so forth. In accordance with some aspects, cognitive agent component 106 can access government databases, such as a natural resources department, to determine the production rates of the oil wells and/or gas wells so that the user has necessary information in order to make an informed decision, without having to specifically request this information.

The results of the requested activity are rendered by an output component 108. The results can be rendered in any perceivable format (e.g., visual, audio, tactile, and so forth). Alternatively or additionally, the results rendered can conform to various parameters (e.g., device through which the results will be presented, location of the user, preferences of user, and so forth).

In accordance with some aspects, the gathered information can be condensed (or expanded) prior to outputting the information based on display screen constraints and/or other device parameters. For example, cognitive agent component 106 can sort the gathered information based on a topic associated with each piece of gathered information. The user can be provided a link to a full version of the information. Thus, the user can browse the condensed version and, if a particular item is of interest, the user can select the link and the full version of that item can be presented to the user. In another example, the user can browse the expanded version of information and condense (or remove from view) at least a subset of information if it is not of interest.

System 100 can be further configured to compliment a user as the user works, talks with others, and performs other actions. Receiver component 102 can recover data from the various user actions and/or the actions of others that are related to the user (e.g., others that are talking to the user). Based on these actions, cognitive agent component 106 can compile relevant data, such as gathering additional content related to the user's current conversational subject. The relevant data can be rendered by output component 108 in various formats (e.g., visual, on a screen, in a head-on display, by audio through an ear piece, tactile, and so on).

Figure 2:
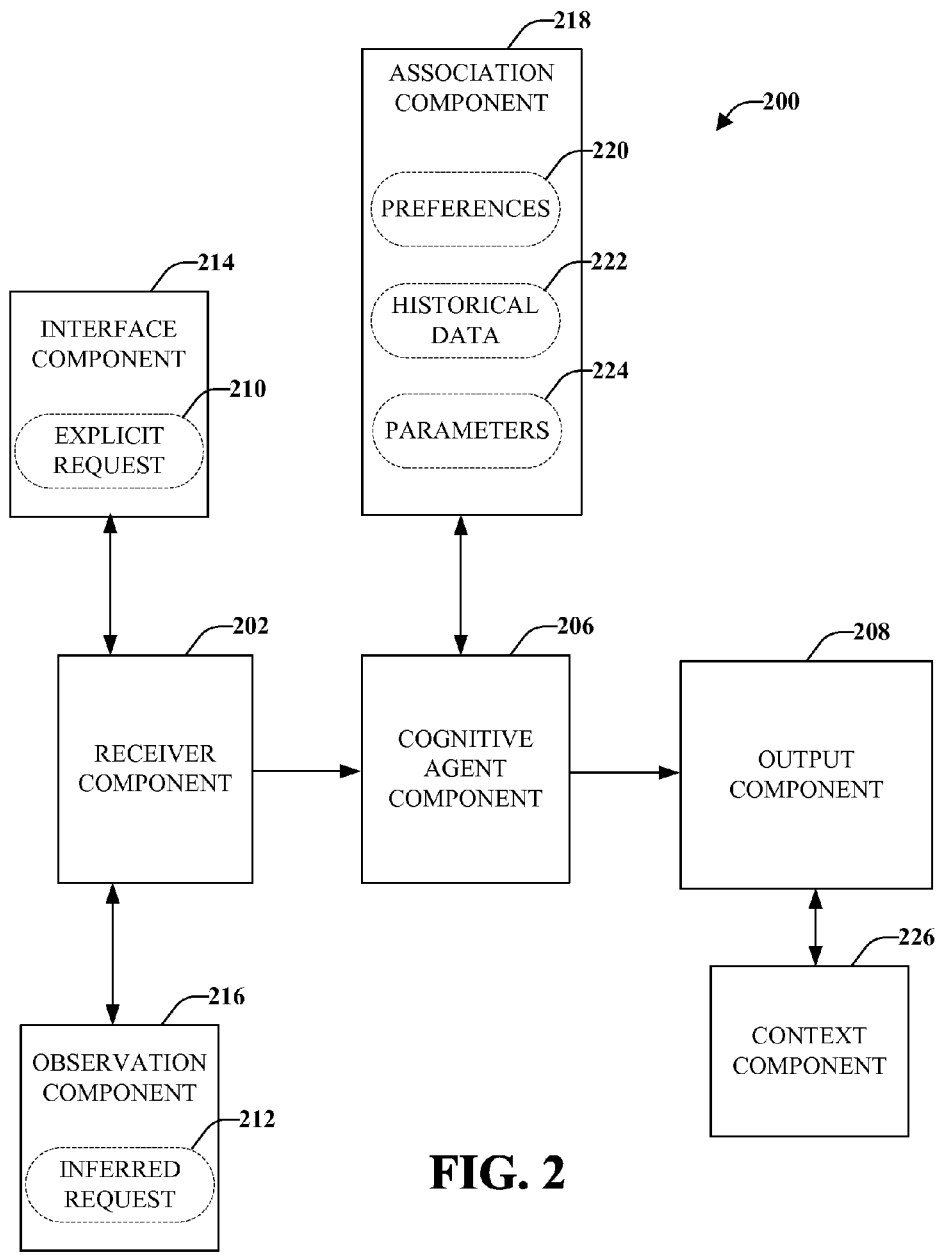
FIG. 2 illustrates a system that automatically performs one or more activities as a surrogate for a user.

FIG. 2 illustrates a system 200 that automatically performs one or more activities as a surrogate for a user. Included in system 200 is a receiver component 202 that is configured to receive a request for implementation of an activity (to achieve a result) by a cognitive agent component 206. The result of the one or more activities can be presented to the user by an output component 208.

In further detail, a user request can be an explicit request 210 and/or an inferred request 212 (e.g., an automatic request). The explicit request 210 can input by the user through interaction with an interface component 214. For example, a user might be running late to a meeting but needs certain information for that meeting (or for after the meeting). As the user is leaving for the meeting, he can enter three or four key words into a search query of interface component 214.

The interface component 214 can provide a graphical user interface (GUI), a command line interface, a speech interface, Natural Language text interface, and the like. For example, a GUI can be rendered that provides a user with a region or means to load, import, select, read, and so forth, various requests and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed. Thus, it might be inferred that the user did want the action performed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with some aspects, an observation component 216 can be utilized to analyze user actions and determine whether a request should be inferred 212 based on a user action and/or inaction. For example, the user might type in (or speak) a few words before leaving for a meeting. However, the user forgot to press an enter key (or perform another action to initiate information conveyance). In this situation, observation component 216 would observe the user entering the key words and then leaving, without completing the action (e.g., information conveyance). In accordance with some aspects, a change of user condition can be utilized as a base for operations. For example, the entrance of a new person into a room can initiate retrieval of information related to the person (e.g., his name, the fact that he owes the user money, a paper authorized by the person, and so on).

Cognitive agent component 206 can operate as a surrogate for the requestor by performing various functions, such as gathering relevant information, researching a topic, and/or other labor intensive functions that a user might not have time (or a desire) to perform. As such, the cognitive agent component 206 can perform research and/or gather information while the requestor is performing a different task (e.g., driving to work, attending a meeting, performing a different computer task, and so forth). When the requestor is ready for the information (or at another appropriate time), the cognitive agent component 206 causes the results of the activities to be rendered by output component 208. In accordance with some aspects, output component 208 can present to the requestor gathered information, simply provide an indication that the function is completed, or other data that allows requestor to verify that the activities are complete. In accordance with some aspects, the information presented by output component 208 can indicate that a particular function cannot be completed or can only be completed partially.

In order to carry out the various activities, cognitive agent component 206 can interact with an association component 218 that can gather and retain information related to the requestor. For example, information gathered by association component 218 can relate to user preferences 220, historical data 222, predefined parameters 224, or combinations thereof. The user preferences 220 can relate to how to present results (e.g., in a visual format, in an audible format, and so on), when to implement actions automatically (e.g., when the user is not utilizing the device, at predefined times, or based on other criteria), and so on.

The historical data 222 can relate to actions that have been previously requested and/or based on other activities of the user. The predefined parameters 224 can relate to criteria that should be met (or that should not be met) related to implementation of actions to achieve a result. In an example, the user might search for Mexican restaurants in a map application. During the same session, the user might next search for stereo stores. Historical data 222 related to these two searches (Mexican restaurants and stereo stores) can be retained in a user profile. However, even though the two different searches were performed in the same session, each search can be retained separately as distinct historical data 222. Then, the next time the user searches for restaurants, the Mexican restaurant profile is obtained and results related to Mexican restaurants are automatically returned, since the historical data 222 indicates that the user is interested in Mexican restaurants. However, information related to stereo stores is not returned, since it is distinguished from the restaurant request.

In an example, a user can submit a request that various documents be gathered (e.g., from a database, from multiple databases, over the Internet, and so on) while the user travels to a meeting. While traveling to that meeting, the cognitive agent component 206 receives the request and infers that the user would like the information upon arriving at a destination (such as by observing that the user is traveling (e.g., GPS data)). Based on the request, cognitive agent component 206 performs the search and/or gathers the information so that the user does not waste precious time performing the search (and be even later to the meeting). If there is a question related to the query and/or the type of information to gather, the cognitive agent can contact the user (e.g., through a mobile phone, text message, so on) for further information.

In accordance with some aspects, a condition of the user can control the level of updates and/or prompts for clarification/additional information. For example, when the user is sleeping (or during the user's normal sleep time, based on historical observation), the user is interrupted only for an emergency. When the user is operating a vehicle, interruptions are limited. In another example, when the user is speaking, only additional data relevant for the subject of the conversation is provided at intervals during which the user is not speaking.

Output component 208 can render the result of the activities in any perceivable format (e.g., visual, audio, tactile, and so on). In accordance with some aspects, the perceivable format can be in a manner that facilitates usage of the information based on a current user context, which can be determined by a context component 226. For example, context component 226 can ascertain the type of device through which the results will be presented and selectively alter the manner of outputting the data to conform to the device.

In accordance with some aspects, context component 226 can evaluate the user environment prior to rendering the results, which can be useful if the information is personal, confidential, or has a sensitivity level above a threshold (which can be predefined by the user or established based on analysis of the information to be rendered). For example, if the user is in a noisy situation, as determined by context component 226, the information (e.g., search results, map data such as driving directions) can be output in a visual manner. In another example, if the user is in a situation where viewing a display would be difficult (e.g., direct sunlight) the results can be automatically output in another format, such as audibly through speakers.

Figure 3:
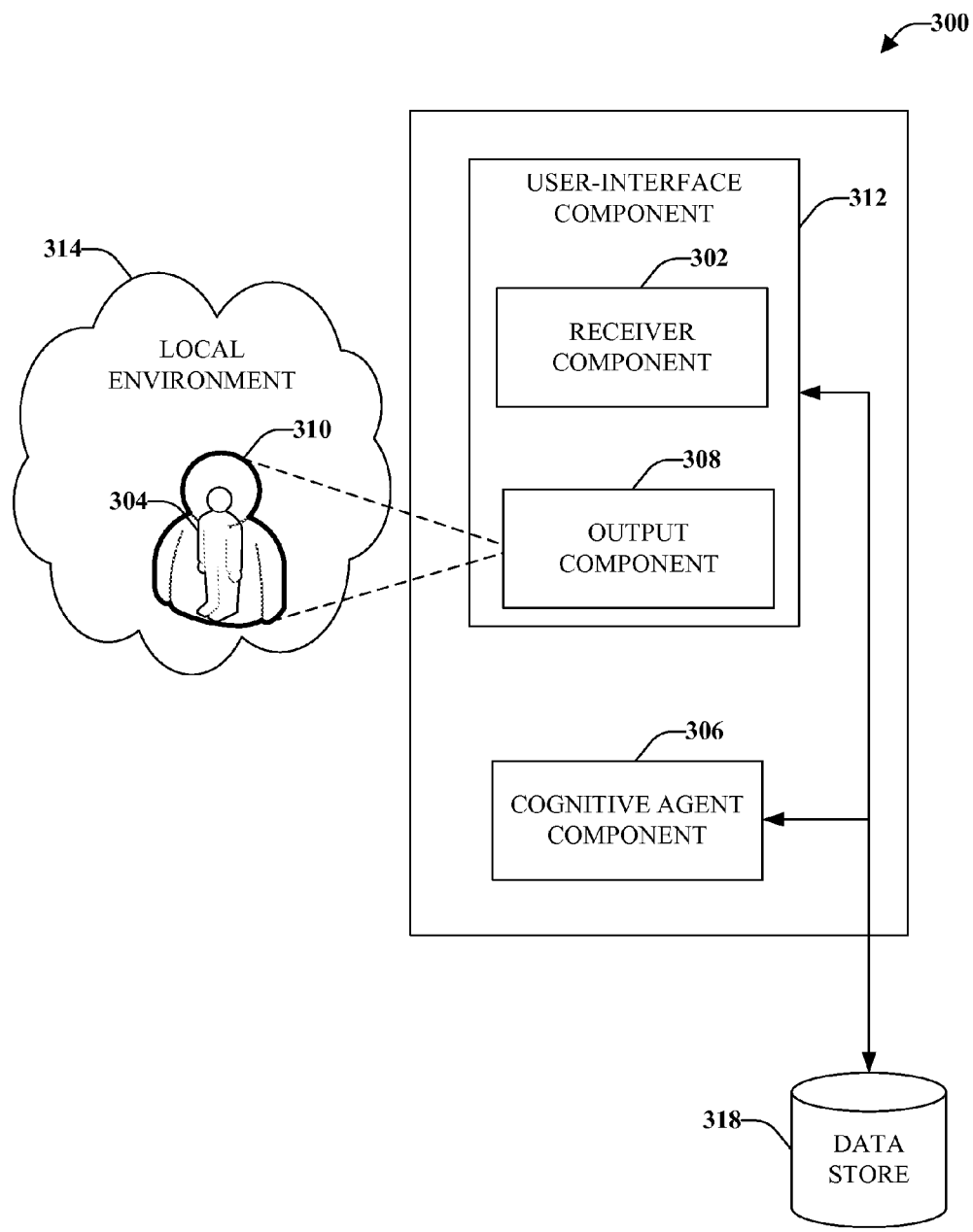
FIG. 3 illustrates a system for providing information to a user through implementation of a cognitive agent represented as a virtual avatar, according to an aspect.

FIG. 3 illustrates a system 300 for providing information to a user through implementation of a cognitive agent represented as a virtual avatar, according to an aspect. An avatar is generally a computer generated representation of a person's representation of himself/herself or an alter ego. The avatar can be represented as a two-dimensional icon (e.g., picture) or a three-dimensional model. In accordance with some aspects, the avatar can be an image based rendering, such as morphing a video to simulate talking movements.

System 300 includes a receiver component 302 that obtains (from a user 304 and/or automatically though an inference of what user 304 might want) an explicit request or an inferred request for one or more actions to be implemented without the user's intervention. In accordance with this aspect, the request can be for a virtual representation of another (in the form of an avatar) to be rendered, which can allow the requestor to visually obtain information in real-time with little, if any, interaction by user. Cognitive agent component 306 can gather information related to one or more avatars 310 and at least one of the avatars 310 can be rendered by output component 308.

As illustrated, receiver component 302 and output component 308 can be included in a user interface component 312. User interface component 312 is intended to include or manage all or a portion of input/output operations associated with user 304 and/or otherwise described herein.

Output component 308 and/or user interface component 312 can include a projector that can display at least a portion of an avatar 310 in a volume of physical space that substantially encapsulates at least a portion of target user 304 or that appears to encapsulate a portion of target user 304. That is to say, a projector can be utilized to initially project or display avatar 310 on or over portions of user 304, which can facilitate a perspective or experience in connection with avatar 310.

A projector can be one or more of a laser-based projector, a light emitting diode (LED) projector or another type of projector, including a virtual retinal display (VRD)-based projector. User interface component 312 can also include one or more cameras (e.g., to monitor movements, behaviors, features, and/or context in connection with user 304, avatar 310, and/or a local environment 314). Also, user interface component 312 can include one or more speakers to present audio outputs.

Further, user interface component 312 can include one or more displays (e.g., monitor, touch-screen, multi-touch surface, head up display (HUD), stereo or Auto-stereo screen, automatic virtual environments, retinal projection, a virtual retinal display, and so forth). In accordance with some aspects, avatar 310 can be visible when viewed through a HUD or VRD. Accordingly, avatar 310 might not be visible to the naked eye, which can be dependent upon the implementation details or equipment employed by user 304. Further, user interface component 312 can include one or more network adapters to provide network accessibility. Although not strictly necessary, network adapter can typically relate to a wireless network.

Alternatively or additionally, one or more keyboards or keypads (standard keys or buttons as well as soft or virtual keys or buttons) can be included in user interface component 312. Also included can be one or more microphones and one or more accelerometers to monitor motion or mechanical accelerations of all or portions of user 304. Further, a variety of other input/output components or sensors can be included in user interface component 312. Such elements include, for example, biometric sensors (e.g., heart rate, blood pressure, and so on), gaze-tracking sensors, or substantially any other suitable input/output component or sensor.

In an example, a trip to France is being planned and a requester 304 desires to know places to visit while on the trip. A mapping application that provides street-side imaging can be presented that allows for viewing of the location and places within that location. The cognitive agent 306 can search for the best places and create an itinerary of events that can be performed during the trip.

In another example, while physically in France, an avatar 310 of a friend that previously visited France can be presented (by output component 308) and can demonstrate the sequence of places she visited and/or recommends. In such a manner, the requestor can virtually see the avatar of the friend while traversing the streets in France. Thus, the avatar 310 can be a virtual guide, which can be beneficial when visiting an unfamiliar location. In accordance with some aspects, cognitive agent component 306, or another system 300 component, can translate local language to a language understandable by the user, and vice versa.

Output component 308 can configure the rending of the avatar to conform with the requestors current conditions. For example, if the user is in a vehicle, the output can be presented on a heads-up display (e.g., overlaid on a portion of a windshield, displayed on a portion of a rear-view mirror, or on another device that allows the requestor to visualize the avatar without taking her eyes from the road). In another example, if the requestor is walking, the avatar can be presented on a mobile device (e.g., mobile phone, heard in an ear piece). In accordance with some aspects, output component 308 can selectively change the manner of presenting the avatar. For example, the requestor is viewing the avatar in a car and the avatar is displayed on a portion of the windshield. When the vehicle is no longer in motion (e.g., parked, stopped at a red light, pulled over to the side of the road, and so on), a full display image of the avatar might be shown in order to enhance the user experience.

In accordance with some aspects, the avatar or other virtual representation can move with the requestor as the requestor is traveling. For example, the requestor might be in a store, such a home improvement store, and desires to build a deck. The requestor might not know what is needed to build the deck, but has a schematic representation with dimensions and other necessary information to customize the deck. Other people (that can be in a remote location (e.g., not in the store)) can be searched for to determine if anyone else has built a deck and has ideas or hints that they can provide to assist the requestor. The person responding to the request can be considered an expert in the field or domain of the desired task.

As the requestor travels through the store, there can be surfaces on which the avatar can be displayed (e.g., at every aisle) or a user device can project the avatar image such that only the requestor can view the image and/or hear the image in the form of an audio output. The avatar can help the user navigate the store or, in another example, arrows can visually display on the floor pointing to the correct direction to find the paint or the wood stain or other items that would be necessary for the deck. For example, the arrow can point to the left or the right or straight ahead. The information displayed can be a live feed, either text-based, audio-based, video-based, or combinations thereof; or previously recorded.

Alternatively or additionally, system 300 can include or be operatively connected to a data store 316. Data store 316 is intended to be a repository of all or portions of data, data sets, or information described herein or otherwise suitable for use with the disclosed aspects. Data store 316 can be centralized, either remotely or locally cached, or distributed, potentially across multiple devices and/or schemas. Furthermore, data store 316 can be embodied as substantially any type of memory, including but not limited to volatile or non-volatile, sequential access, structured access, or random access and so on. It should be understood that all or portions of data store 316 can be included in system 300, or can reside in part or entirely remotely from system 300.

In another example, many people work out for health reasons and personal reasons. However, some people might not be motivated to work out alone and/or would have more incentive to work out if competing with another. Thus, a person can be on a treadmill, for example, and search for another person (in the form of an avatar) that is willing to run with them. In accordance with some aspects, the ability of the avatar can be adjusted such that the ability of the avatar can more closely match the requestor. In such a manner, the speed of the avatar 310 can be set or adjusted, either by the user 304 or automatically based upon an inference or intelligent determination. For example, avatar actions can be sped up or slowed down according to a user's competence or comfort level or an inference thereof.

Alternatively or additionally, real-world experiences can be applied, such as inclinations, differences in terrain, and so forth. In accordance with some aspects, a map event can be included, such as running with a marathon, which can be helpful if the requestor is training for a race or other competition events. These aspects can also be applied to other sporting events (e.g., bike riding, swimming, and so forth).

Figure 4:
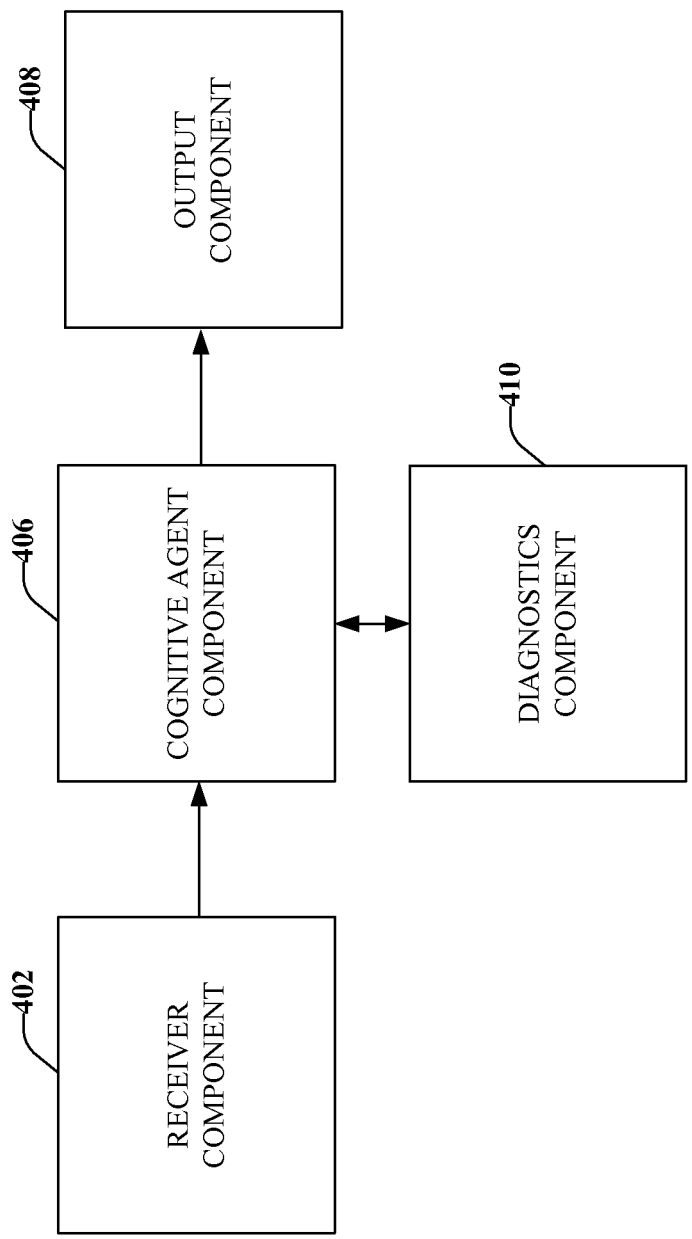
FIG. 4 illustrates a system that is configured to perform self-diagnostics though a cognitive agent, according to an aspect.

With reference now to FIG. 4, illustrated is a system 400 that is configured to perform self diagnostics though a cognitive agent, according to an aspect. System 400 can be configured to diagnose a problem and/or attempt to mitigate machinery failures automatically. A receiver component 402 can be associated with machinery, such as industrial machines, manufacturing machines, and so forth. The receiver component 402 can gather data from various machine components through the use of sensors or other data (e.g., cycle counts, noise or decibel levels, and so on).

A cognitive agent component 406 can intelligently gather information related to the machinery. The information can include operating parameters, tolerance limits for machinery parts (e.g., wear items), expected life for wearable machinery parts, as well as other factors associated with the machinery (e.g., maintenance history, preventive maintenance schedule, and so on). Additionally, information related to a serial number, date of manufacture, name of (and other information associated with) a manufacturer, name of (and other information associated with) a parts supplier and/or service technician.

As a function of the information gathered and/or retained by cognitive agent component 406, a diagnostics component 410 can perform self-diagnostics on the machinery. The diagnostics can be performed at regular intervals, when a problem is suspected, or based on other intervals (e.g., idle time, planned shutdown, unplanned shut down, and so forth). The diagnostics can measure various parameters and gather pertinent data (e.g., cycle times, processing parameters, and so on) and report the information to cognitive agent component 406.

The information can be utilized by cognitive agent component 406 to determine whether there is a potential problem with the machinery (e.g., parts should be replaced before a catastrophic failure occurs and/or to preserve the life of the machinery, and so on). In accordance with some aspects, cognitive agent component 406 can gather the information in order to evaluate machinery reliability, quality, and/or other factors that can be considered for a future purchasing decision (e.g., what is the mean time between failures for this machine, how does this machine manufacturer compare to other manufacturers, and so on).

Alternatively or additionally, if a problem is discovered by diagnostics component 410, cognitive agent component 406 can automatically take action to correct the problem. For example, it might be determined that a part should be replaced. Cognitive agent component 406 can access the manufacture part number and autonomously order the part (based on pre-established criteria related to pricing, delivery, payment terms, and so on). In accordance with some aspects, cognitive agent component 406 can gather data related to costs associated with purchasing a replacement part and might even compare those costs with the estimated cost of not buying the part (e.g., what can be expected by not taking action now). Further, cognitive agent component 406 can review relevant information and make a determination whether action should be taken immediately or if there is adequate time before action is necessary (e.g., days, weeks, months, and so on).

According to some aspects, cognitive agent component 406 might research a detected issue before presenting the results of the diagnostic test. For example, cognitive agent component 406 might access the manufacturer's website for information related to the machinery. In another example, cognitive agent component 406 can access an operation and maintenance manual for the needed information.

Data associated with the actions and/or recommendations of cognitive agent component 406 can be provided through output component 408. For example, after a part is ordered, output component 408 can automatically convey the purchase information (e.g., invoice, shipping details, and so on) to a user and/or entity responsible for paying the invoice, receiving the part, and so forth.

Figure 5:
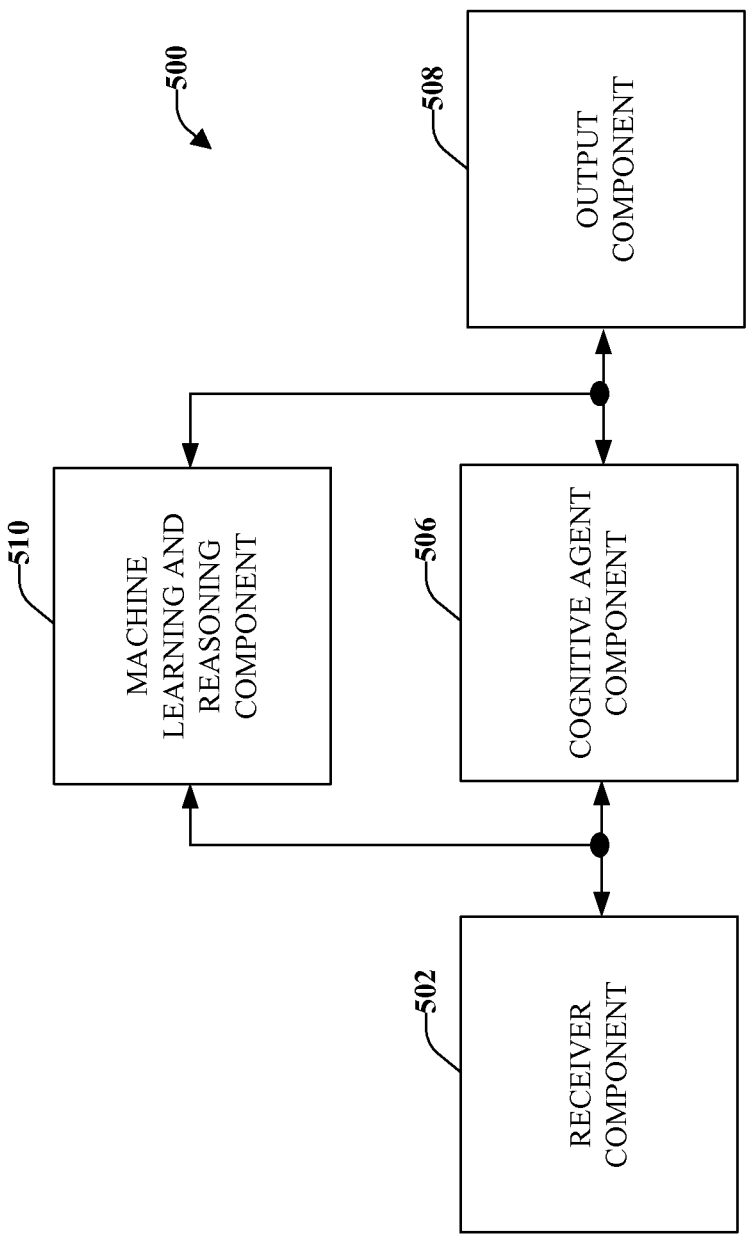
FIG. 5 illustrates a system that employs machine learning and reasoning to automate one or more features in accordance with the disclosed aspects.

FIG. 5 illustrates a system 500 that employs machine learning and reasoning to automate one or more features in accordance with the disclosed aspects. Included in system 500 is a receiver component 502 that is configured to receive a request from a user and/or entity (e.g., the Internet, another system, a computer, machinery, and so forth), hereinafter referred to as users and/or entity, depending on the context. The request can be an explicit request or an implicit request (which can be an inferred request). A cognitive agent component 506 is configured to interpret the request and determine actions that need to be conformed to in order to comply with the request. In accordance with some aspects, the determination might be that actions by other people and/or entities need to be performed to comply with the request. Details related to the actions implemented by cognitive agent component 506 are rendered by output component 508. According to some aspects, cognitive agent component 506 might not be able to process the request, thus, a failure message can be conveyed through output component 508. The failure message can include reasons why the request could not be completed. The reason might be that more information is needed and/or other people/entities that are needed to complete the request are not available and/or unable to assist.

A machine learning component 510 can employ various machine learning techniques to automatic one or more features. The machine learning and reasoning component 510 can employ principles of probabilistic and decision theoretic inference and rely on predictive models constructed through the use of machine learning procedures. Logic-centric inference can also be employed separately or in conjunction with probabilistic methods. The machine learning and reasoning component 510 can infer intention of a request by obtaining knowledge about the possible actions and knowledge about what the user is trying to accomplish based on applications or programming being implemented by the user, the application/program context, the user context, or combinations thereof. Based on this knowledge, the machine learning and reasoning component 510 can make an inference based on which actions to implement, which other users/entities to employ, or combinations thereof.

If machine learning and reasoning component 510 has uncertainty related to the intent or request, machine learning and reasoning component 510 can automatically engage in a short (or long) dialogue or interaction with the user (e.g., "What do you mean?"). In accordance with some aspects, machine learning component 510 engages in the dialogue with the user through another system component. Computations of the value of information can be employed to drive the asking of questions. Alternatively or additionally, cognitive agent component 506 can anticipate a user action (e.g., "where is he heading to?") and continually update a hypothesis as more user actions are gathered. Cognitive agent component 506 can accumulate data or perform other actions that are a result of anticipation of the user's future actions.

The various aspects (e.g., in connection with receiving a request, determining the meaning of the request, distinguishing a request from other actions, implementation of actions to satisfy the request, and so forth) can employ various artificial intelligence-based schemes for carrying out various aspects thereof. For example, a process for determining if a particular action is a request for an action to be performed or a general action (e.g., an action that the user desires to perform manually) can be enabled through an automatic classifier system and process.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed. In the case of requests, for example, attributes can be common requests, a combination of requests, a pattern of requests, and the classes are applications or functions that need to be utilized to satisfy the request.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more aspects can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to implement an action, which action to implement, what requests to group together, relationships between requests, and so forth. The criteria can include, but is not limited to, similar requests, historical information, and so forth.

Additionally or alternatively, an implementation scheme (e.g., rule) can be applied to control and/or regulate requests and resulting actions, inclusion of a group of users to carry out actions associated with the requests, privileges, and so forth. It will be appreciated that the rules-based implementation can automatically and/or dynamically interpret a requests based upon a predefined criterion. In response thereto, the rule-based implementation can automatically interpret and carry out functions associated with the request by employing a predefined and/or programmed rule(s) based upon any desired criteria.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
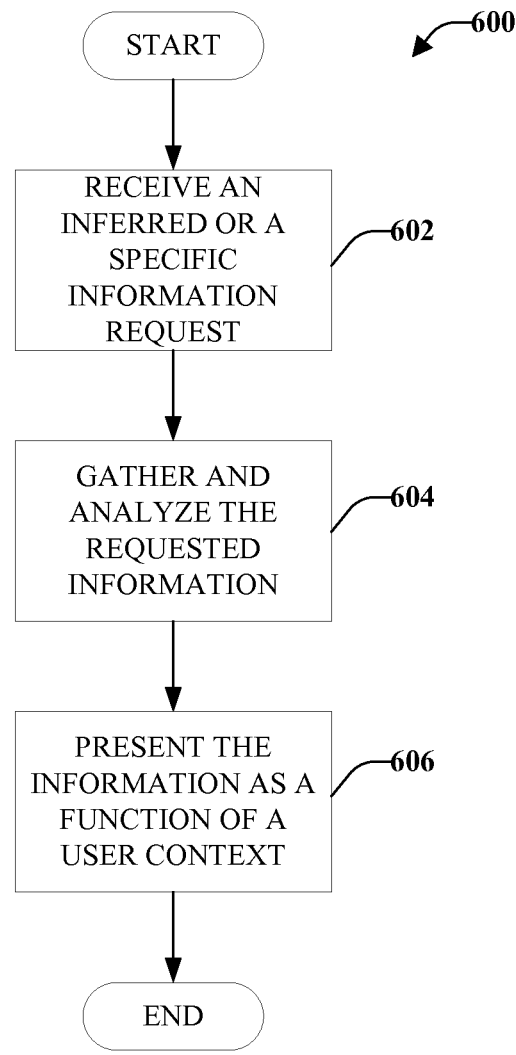
FIG. 6 illustrates a method for automatically performing actions to supplement actions performed by a user, according to an aspect.

FIG. 6 illustrates a method 600 for automatically performing actions to supplement other actions performed by a user. Method 600 starts, at 602, when a request for performance of an action is received. The request can be a specific request or an inferred request and can relate to searches, mapping applications, or other actions to be performed. The performance of an action can be intended to be performed automatically while the requestor is performing another action at substantially the same time. In accordance with some aspects, the request is inferred based upon observance of another activity being performed or no activities performed after receipt of the request. In accordance with some aspects, the action can supplement an activity of the user.

At 604, the requested information is gathered and analyzed. The information can be gathered as a function of preferences, historical information, predefined parameters, or combinations thereof. The gathered information is presented, at 606. The presentation is in a manner that facilitates usage of the information based on a current user context, which can be device parameters, an environment, an activity level (e.g., is the user performing another task), or combinations thereof. In accordance with some aspects, the gathered information can be presented in the form of a virtual avatar.

In accordance with some aspects, the gathered information is condensed based on a topic associated with each piece of gathered information and the condensed information is presented with a link to a full version of the information. According to some aspects, a subsequent action is performed as a function of the gathered information and linkage data for the gathered information and the subsequent action is provided to a user.

According to some aspects, the gathered and presented data can relate to a user search based on known information about the user. For example, the user might have children. As the user is searching for hotels in a specific area of a map application, the user might be interested in hotels that offer continental breakfasts. However, based on the knowledge that the user has children, results that do not necessarily conform to the continental breakfast requirement might be presented to the user if those hotels are advertised as family friendly, as this might be more useful for the user. These alternative search results might be presented in a format that lets the user know there are alternatives available and if the user is interested, those alternatives will be presented. Thus, the user is given the option to obtain the original search results and/or the expanded search results.

Figure 7:
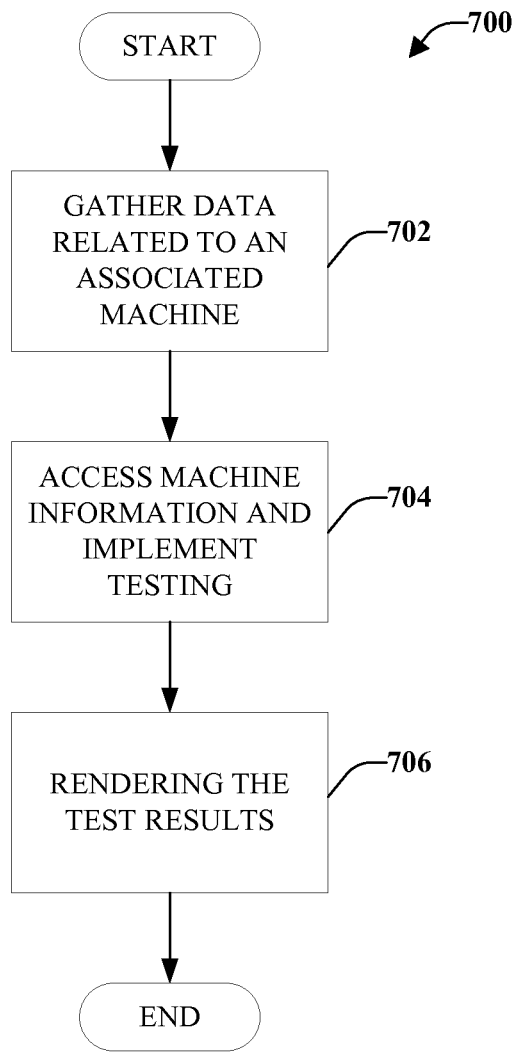
FIG. 7 illustrates a method for automatic diagnostics and repair in accordance with one or more aspects.

FIG. 7 illustrates a method 700 for automatic diagnostics and repair in accordance with one or more aspects. Method 700 can be implemented to mitigate machinery failure and prolong the life of the machinery. Method 700 starts, at 702, when data related to a machine is gathered (e.g., cycle counts, noise or decibel levels, and so on.

At 704, machine information is accessed and a determination is made whether testing of the machine should occur. The machine information can include operating parameters, tolerance limits for machinery parts, expected life for wearable machinery parts, as well as other factors associated with the machinery (e.g., maintenance history, preventive maintenance schedule, and so on). Additionally, information related to a serial number, date of manufacture, name of (and other information associated with) a manufacturer, name of (and other information associated with) a parts supplier and/or service technician.

An instruction to perform a test on the machinery is sent and the results of the test are output to a user. The results of the test can include the actual test report as well as subsequent actions that were performed based on the test results. The diagnostics can be performed at regular intervals, when a problem is suspected, or based on other intervals (e.g., idle time, unplanned shut down, planned shut down, and so forth). The diagnostics can measure various parameters and gather pertinent data (e.g., cycle times, processing parameters, and so on). The diagnostics can result in actions that are performed automatically and/or actions that are recommended to be performed by a user.

Figure 8:
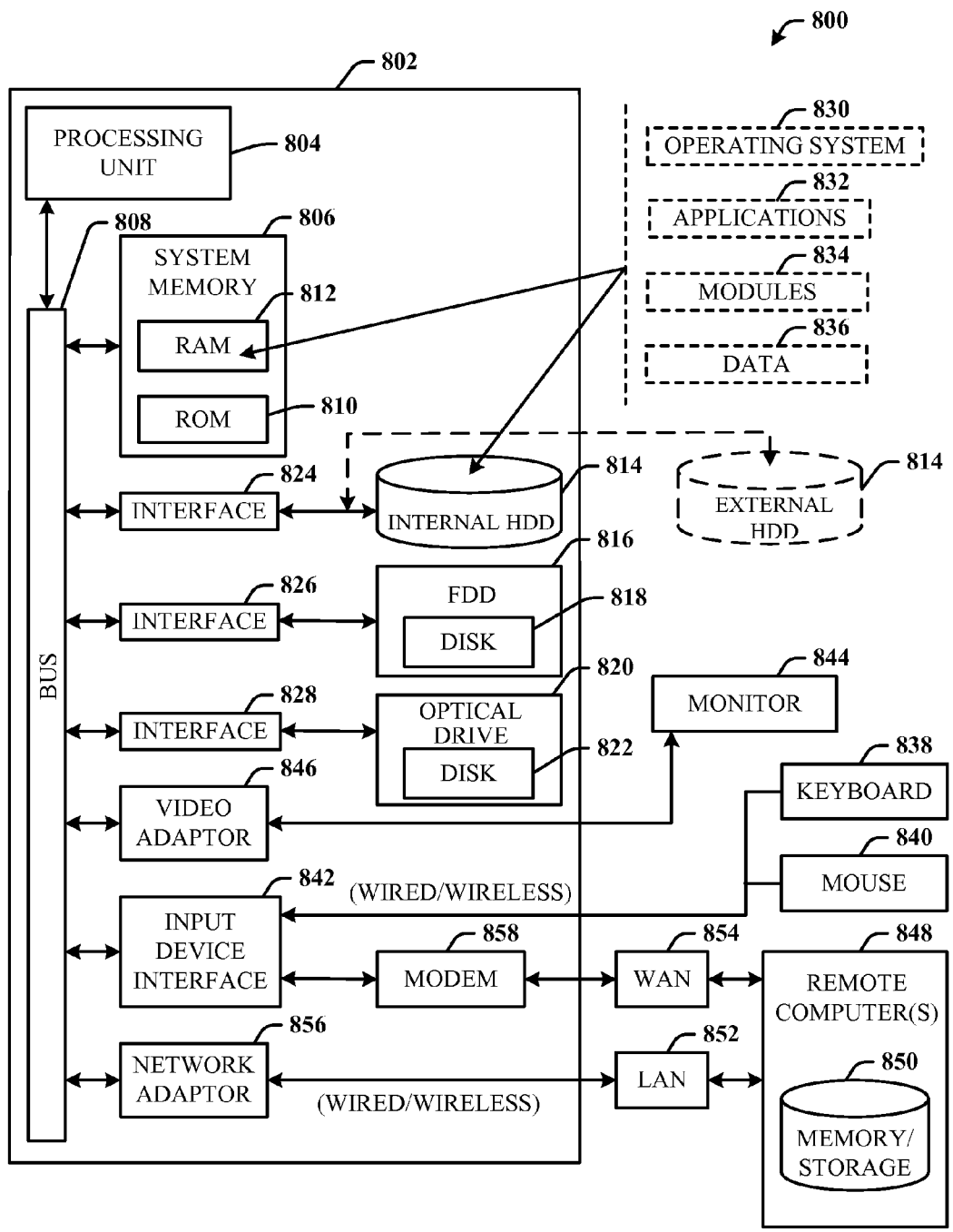
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects disclosed herein, FIG. 8 and the following discussion are intended to provide a brief, general description of a suitable computing environment 800 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the various aspects can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 through an interface, such as a video adapter 846. In addition to the monitor 844, a computer typically includes other peripheral output devices (not shown), such as speakers, printers, etc.

The computer 802 may operate in a networked environment using logical connections through wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adaptor 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 through the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
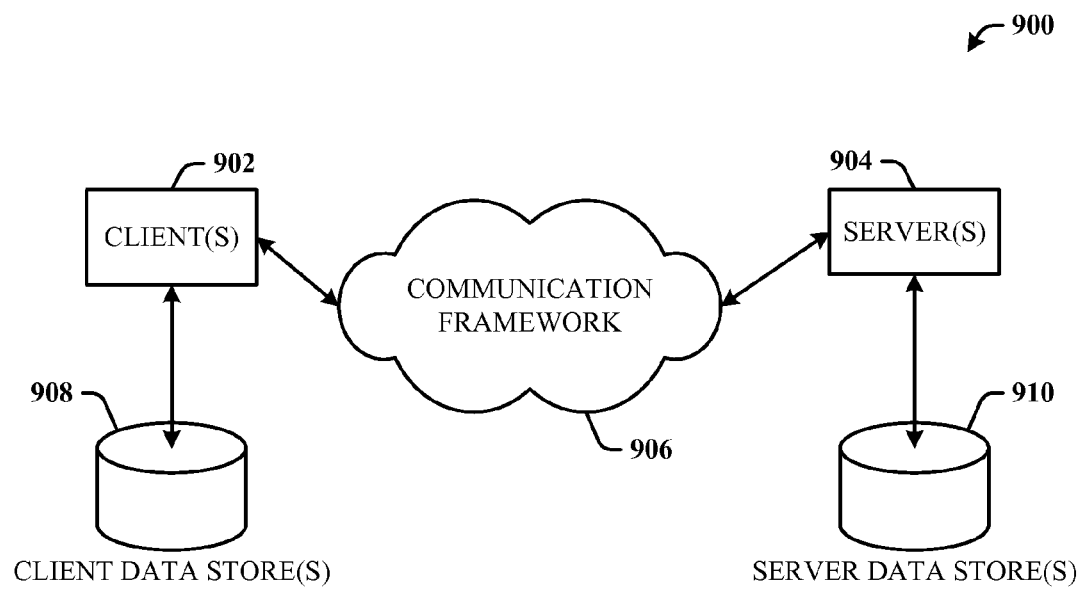
FIG. 9 illustrates a schematic block diagram of an exemplary computing environment in accordance with the various aspects.

Referring now to FIG. 9, there is illustrated a schematic block diagram of an exemplary computing environment 900 in accordance with the various aspects. The system 900 includes one or more client(s) 902. The client(s) 902 can be hardware and/or software (e.g., threads, processes, computing devices). The client(s) 902 can house cookie(s) and/or associated contextual information by employing the various aspects, for example.

The system 900 also includes one or more server(s) 904. The server(s) 904 can also be hardware and/or software (e.g., threads, processes, computing devices). The servers 904 can house threads to perform transformations by employing the various aspects, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated through a wired (including optical fiber) and/or wireless technology (including non-radio wireless communications). The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising."

The term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mea n "one or more" unless specified otherwise or clear from the context to be directed to a singular form.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A computer-implemented method of automatically providing information to a client device to supplement a user activity inferred by the client device, the method comprising:
   receiving by a server having a processor an automatic request to provide information relevant to an inferred subject, wherein the automatic request is a request to provide information that is automatically provided to the server without a client device receiving a user-provided input requesting the information and wherein the inferred subject is based at least partially on a location detected by the client device and the user activity detected by the client device;
   retrieving by the processor a set of results from a data store, the set of result including the information relevant to the inferred subject;
   transforming by the processor the set of results into a client-renderable message that is programmed by the processor to be presented by the client device; and
   providing by the server to the client device the client-renderable message that includes the set of results to be rendered in accordance with a user environment without receiving a user-provided request to provide the results.

2. The method of claim 1 further comprising, transmitting a message to the client device that indicates the set of results are available to be provided to the client device.

3. The method of claim 2 wherein the message comprises a text message.

4. The method of claim 1, wherein the set of results supplements a motion-based activity that at least partially defines the user environment.

5. The method of claim 4, wherein the request includes location-based information, which indicates engagement in the motion-based activity.

6. The method of claim 4, wherein the set of results are programmed to be rendered to supplement the motion-based activity.

7. The method of claim 1, wherein the set of results supplements an event-related activity that at least partially defines the user environment.

8. A computer-readable memory device storing computer-executable instructions that, when executed by a processor, perform a method of automatically providing information to supplement a user activity, the method comprising:
   receiving an indication that a first user and a second user are engaging in an activity related to a location;
   inferring a request to provide information to the first user that describes the second user, wherein the request is inferred without receiving an express request manually submitted from the first user;
   retrieving a set of information from a data store that is related to the second user and is stored in association with the second user; and
   providing to a client device of the first user the set of information to be rendered in accordance with a user environment.

9. The device of claim 8, wherein the set of information is customizable based on the user environment.

10. The device of claim 8, wherein the set of results is programmed to be rendered using a virtual avatar.

11. The device of claim 8, wherein the indication includes a location identity, and wherein inferring the request to provide information includes referencing the location identity in a data store to determine that the second user is associated with the location identity.

12. The device of claim 8, wherein the set of information includes a profile of the second user.

13. The device of claim 8, wherein the set of information includes a description of an activity engaged in by the second user at the location.

14. A computer-readable memory device storing computer-executable instructions that, when executed by a processor, perform a method of automatically providing information to supplement a user activity, the method comprising:
   receiving by a server a request to provide information, wherein the request to provide information is automatically provided to the server without a user of a client device manually submitting the request and wherein the request indicates that the information is to be provided when the client device is positioned at a location;
   retrieving from a data store a set of results including the information that was requested; and
   providing to the client device the set of results when it is determined that the client device is at the location.

15. The device of claim 14, wherein the method further comprises identifying other information that would clarify the request to provide information and sending a text message to the client device requesting the other information.

16. The device of claim 14, wherein the set of results is programmed to be rendered using a virtual avatar.

17. The device of claim 14, wherein the set of results supplements a motion-based activity that at least partially defines a user environment.

18. The device of claim 17, wherein the request includes location-based information, which indicates engagement in the motion-based activity.

19. The device of claim 17, wherein the set of results are programmed to be rendered to supplement the motion-based activity.

20. The device of claim 14, wherein the set of results supplements an event-related activity that at least partially defines a user environment.

21. A computing system comprising:
   a computer processor; and
   a computer-readable memory device that is coupled to the computer processor and that stores computer-executable instructions, which are executed using the computer processor to perform operations comprising:
      receiving by a server a request to provide information relevant to an inferred subject, wherein the request to provide information is automatically provided to the server without a user of a client device submitting the request and wherein the inferred subject is based at least partially on a location and the user activity;
      retrieving from a data store a set of results including the information relevant to the inferred subject; and
      providing to the client device the set of results to be rendered in accordance with a user environment.

22. The system of claim 21, wherein the operations further comprise transmitting a message to the client device that indicates the set of results are available to be provided to the client device.

23. The system of claim 22, wherein the message comprises a text message.

24. A computing system comprising:
   a computer processor; and
   a computer-readable memory device that is coupled to the computer processor and that stores computer-executable instructions, which are executed using the computer processor to perform operations comprising:
receiving an indication that a first user and a second user are engaging in an activity related to a location;
inferring a request to provide information to the first user that describes the second user, wherein the request is inferred without receiving an express request manually submitted from the first user;
retrieving a set of information from a data store that is related to the second user and is stored in association with the second user; and
providing to a client device of the first user the set of information to be rendered in accordance with a user environment.

25. The system of claim 24, wherein the indication includes a location identity, and wherein inferring the request to provide information includes referencing the location identity in a data store to determine that the second user is associated with the location identity.

26. The system of claim 24, wherein the set of information includes a profile of the second user.

27. The system of claim 24, wherein the set of information includes a description of an activity engaged in by the second user at the location.

28. A computing system comprising:
a computer processor; and
a computer-readable memory device that is coupled to the computer processor and that stores computer-executable instructions, which are executed using the computer processor to perform operations comprising:
receiving by a server a request to provide information, wherein the request to provide information is automatically provided to the server without a user of a client device manually submitting the request and wherein the request indicates that the information is to be provided when the client device is positioned at a location;
retrieving from a data store a set of results including the information that was requested; and
providing to the client device the set of results when it is determined that the client device is at the location.

29. The system of claim 28, wherein the operations further comprise identifying other information that would clarify the request to provide information and sending a text message to the client device requesting the other information.

30. The system of claim 28, wherein the set of results supplements a motion-based activity that at least partially defines a user environment.

31. The system of claim 30, wherein the request includes location-based information, which indicates engagement in the motion-based activity.

32. The system of claim 30, wherein the set of results are programmed to be rendered to supplement the motion-based activity.

33. The system of claim 28, wherein the set of results supplements an event-related activity that at least partially defines a user environment.

* * * * *